April 28, 1942.     H. A. REED     2,281,512
FLOW METER
Filed Aug. 24, 1940     2 Sheets-Sheet 1

INVENTOR
Harlow A. Reed
BY
ATTORNEYS

April 28, 1942.  H. A. REED  2,281,512
FLOW METER
Filed Aug. 24, 1940   2 Sheets-Sheet 2

INVENTOR
Harlow A. Reed
BY
ATTORNEYS

Patented Apr. 28, 1942

2,281,512

UNITED STATES PATENT OFFICE 2,281,512

FLOW METER

Harlow A. Reed, Oakdale, Calif.

Application August 24, 1940, Serial No. 354,007

3 Claims. (Cl. 73—215)

This invention relates to equipment for use in the automotive field, and particularly to a flow meter for indicating the fuel consumption of an internal combustion engine at different speeds.

The principal object of my invention is to provide a meter for the purpose adapted to be interposed in the fuel feed line of an engine, so constructed and arranged that the fuel consumption of the engine will be clearly and accurately indicated.

The meter is thus particularly adapted for use in engine tuning operations, since it will give the operator an accurate indication of actual engine performance at the time, so that he may make the necessary adjustments, or recommend or make necessary repairs, in the event that the meter shows poor engine performance.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the the several views.

Figure 1:
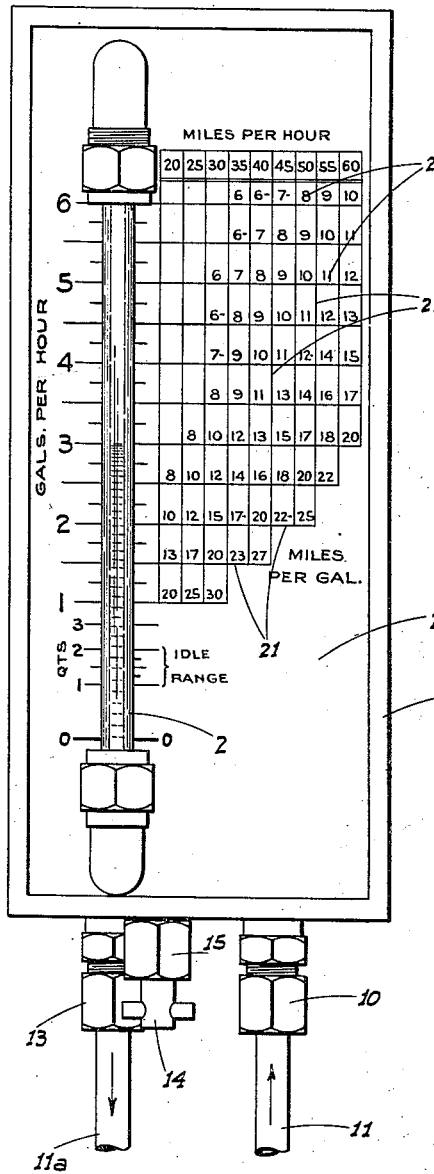
Figure 1 is a front elevation of the meter.
Figure 2:
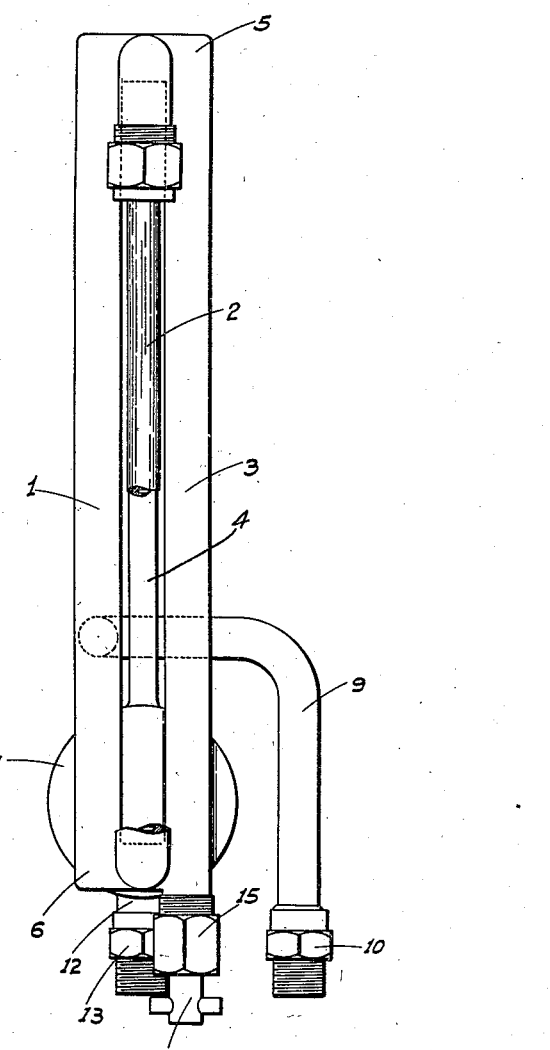
Figure 2 is a similar view of the metering unit, detached from the casing.

Referring now more particularly to the characters of reference on the drawings, the meter comprises a vertical intake tube 1, a vertical gauge tube 2, a vertical meter-tube casing 3 and a vertical air tube 4. All the tubes, as well as casing 3 which also is actually a tube, are connected in common at their upper end by a head 5 while tubes 1 and 2 and casing 3 are connected in common at their lower end by a base passage 6. The air tube 4 however discharges into the top of an enclosed tank 7 which adjacent the top communicates with casing 3 a short distance above tube 6 by means of a port 8.

An intake passage member 9 connects with tube 1 above the level of port 8. This member on its outer end is provided with a compression fitting 10 so that fuel tight connection may be made with a fuel feed pipe 11 from the source of supply. A fuel outlet passage member 12 depends from tank 7 and is also provided with a compression fitting 13 so that connection may be made with a fuel pipe 11a leading to the engine. The entire tube unit, from intake 9 to outlet 12, forms an air and liquid tight enclosure.

The casing 3 depends a short distance below the passage 6 and projecting upwardly into said casing from below in clearance relation to the wall thereof is a metering tube 14. This tube is open on top but closed at the bottom, and is removably secured in place in the casing by a compression coupling unit 15 between said tube and the casing at the lower end of the latter. Between passage 6 and port 8, a sealing ring or collar 16 is disposed in the casing 3 about the tube 14 so as to prevent leakage between said casing and the passage 6.

A large port 17 is provided in tube 14 at a level to establish communication between tube 6 and the interior of tube 14. A series of vertically spaced bleed or fuel escape openings 18, of increasing size from the bottom upwardly, are provided in the tube 14, the lowest opening being on a level with the bottom of port 8.

The metering unit above described is enclosed, except for fittings 10 and 13 and coupling 15, within a glass-fronted housing 19 preferably of rectangular form. The glass gauge tube 2 only is exposed to the front of the housing, being backed by a gauge plate 20 which extends over the area of the housing and conceals the remaining parts of the unit.

Figure 3:
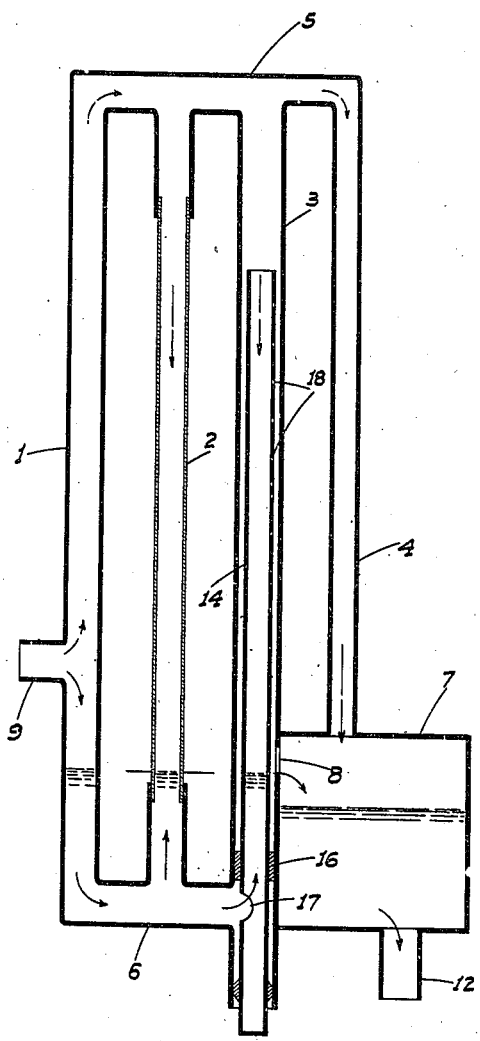
Figure 3 is a diagrammatic section of the unit.
Figure 4:
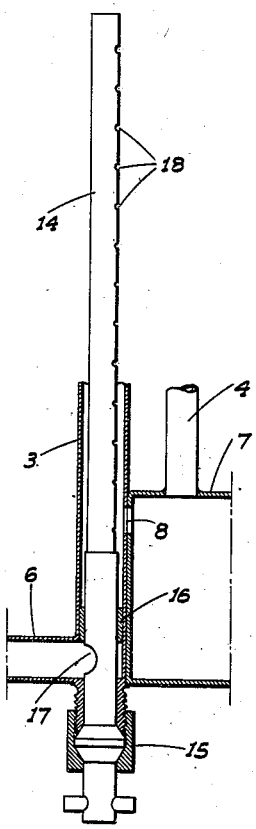
Figure 4 is a fragmentary sectional elevation illustrating the removable mounting of the metering tube.

It may here be remarked that while the various tubes and other parts are shown in Fig. 3 as being all disposed in a common plane, this is for clarity of illustration only, since in actual practice, the tubes are grouped as close to each other and to the tank as is feasible, for the sake of compactness.

The gauge plate 20 is marked to provide a number of horizontal vertically spaced lines 21 to indicate gallons of fuel consumed per hour, as indicated by the level of the liquid in the gauge tube 2, and is also marked with a number of vertical horizontally spaced lines 22 crossing lines 21 and forming columns for different speeds as indicated and in which figures 23 denoting miles traveled per gallon of fuel, at such different speeds, are printed. The lines 21 are carefully calibrated, and the figures 23 carefully computed, with relation to the size of openings 18 from tests conducted at the factory, so as to thereafter give accurate indications of engine performance in terms of fuel consumption and mileage obtained.

In operation, when the meter is connected to the fuel feed line and with the engine running, the flow of fuel through the unit will of course be in proportion to the amount consumed by the engine, and the higher the engine speed, the greater will be such consumption.

The fuel and air bubbles mingled therewith enter the tube 1 through passage 9, the fuel flowing down to cross passage 6 and the air rising to the head 5. This air then of course exerts a downward pressure in the gauge tube 2, the casing 3 and metering tube 14 therein, and also in the tank 7, as will be obvious. It is necessary that the capacity of the tank shall be at least as great as that of the fuel retaining portion of the remainder of the unit, in order that the air may flow back and forth in the tubes as the fuel level rises and falls, and thus maintain the necessary equalized pressure in the tubes.

When the engine is idle, the fuel level in the meter remains in tubes 2 and 14 at the level of the lowest opening 18, (or port 8) as shown in Fig. 3, or at the zero mark on the gauge or scale plate 20.

The faster the flow from outlet 12, due to engine consumption, the more fuel will flow into the meter, and it must obviously rise in the metering tube in order to flow through a sufficient number of orifices 18 to provide a volume equal to that leaving the tank. The fuel also of course rises in the gauge tube 2 to a corresponding extent, and the reading on the scale or gauge plate in line with the level of the liquid showing through tube 2, will provide an accurate indication of the amount of fuel being consumed.

The metering tube is made removable in order to inspect and clean out the small orifices 18 if necessary, as well as to enable the orifices and port 17 being located in the proper positions.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A liquid flow meter comprising a vertical feed tube having an intake above its lower end, a vertical gauge tube, a vertical meter-tube casing, a perforated meter tube in the casing, a vertical air tube, a tank having a bottom outlet and into which the air tube and casing discharge, a hollow head connecting all the tubes and the casing at the top, and a base passage member connecting the feed and gauge tubes and the casing at their lower ends and with which the meter tube communicates adjacent its lower end; there being a seal between the casing and meter tube between the points of communication of the casing with the tank and of the meter tube with the base passage member; the gauge tube being disposed exteriorly of the other tubes and the casing and spaced therefrom whereby a flat gauge plate may be placed directly behind said gauge.

2. A liquid flow meter comprising a vertical feed tube having an intake above its lower end, a vertical gauge tube, a vertical meter-tube casing, a perforated meter tube in the casing, a vertical air tube, a tank having a bottom outlet and into which the air tube and casing discharge, a hollow head connecting all the tubes and the casing at the top, a base passage member connecting the feed and gauge tubes and the casing at their lower ends and with which the meter tube communicates adjacent its lower end; there being a seal between the casing and meter tube between the points of communication of the casing with the tank and of the meter tube with the base passage member, and means removably mounting the meter tube in the casing and so that said tube may be withdrawn without disturbing the head and base passage member.

3. A liquid flow meter comprising a vertical feed tube having an intake above its lower end, a vertical gauge tube, a vertical meter-tube casing, a vertical air-tube, a tank having a bottom outlet and into which the casing discharges on one side and above its lower end, a hollow head connecting the tubes and casing at the top, a base member having a base passage communicating with said feed and gauge tubes and said casing, a perforated meter tube projecting upwardly through the base passage and casing from below the same and when in place communicating with said passage, a sealing gasket in the casing below the point of discharge thereof into the tank and through which the meter tube slidably projects, and means removably securing said meter tube in connection with the base member below the same for downward withdrawal from place.

HARLOW A. REED.